United States Patent
Huang

(10) Patent No.: US 11,604,109 B1
(45) Date of Patent: Mar. 14, 2023

(54) PRESSURE SENSING METAL DIAPHRAGM, PRESSURE SENSING DIAPHRAGM ASSEMBLY AND PRESSURE GAUGE

(71) Applicant: MULTI-LORE CO., LTD., Chiayi (TW)

(72) Inventor: Chang-Ching Huang, Chiayi (TW)

(73) Assignee: MULTI-LORE CO., LTD., Chiayi (TW)

( * ) Notice: Subject to any disclaimer, the term of this patent is extended or adjusted under 35 U.S.C. 154(b) by 30 days.

(21) Appl. No.: 17/392,661

(22) Filed: Aug. 3, 2021

(51) Int. Cl.
    *G01L 7/00*     (2006.01)
    *G01L 19/04*     (2006.01)
    *G01L 7/08*     (2006.01)
    *G01L 19/14*     (2006.01)

(52) U.S. Cl.
CPC ............ *G01L 7/082* (2013.01); *G01L 7/084* (2013.01); *G01L 19/142* (2013.01)

(58) Field of Classification Search
CPC ............ G01L 3/24; G01L 3/242; G01L 5/08; G01L 5/10; G01L 5/101; G01L 5/108; G01L 5/16; G01L 5/1627; G01L 5/167; G01L 5/22; G01L 5/28; G01L 23/085; G01L 23/20; G01L 5/0061; G01L 5/0071; G01L 5/008; G01L 5/06; G01L 5/171; G01L 7/106
USPC .................................................... 73/700–756
See application file for complete search history.

(56) References Cited

U.S. PATENT DOCUMENTS

| | | | | | |
|---|---|---|---|---|---|
| 1,437,728 | A | * | 12/1922 | Della Veneria | G01L 7/082 92/104 |
| 2,241,056 | A | * | 5/1941 | Chilton | G01L 7/082 137/157 |
| 4,241,325 | A | * | 12/1980 | Di Giovanni | G01L 9/0055 338/42 |
| 5,058,436 | A | * | 10/1991 | Bellec | G01L 9/0064 338/4 |
| 5,739,434 | A | * | 4/1998 | Jensen | G05D 16/163 73/730 |
| 2004/0187587 | A1 | * | 9/2004 | Baba | G01L 19/0645 73/715 |
| 2007/0227252 | A1 | * | 10/2007 | Leitko | G01L 9/0079 73/717 |
| 2009/0308168 | A1 | * | 12/2009 | Motoyama | G01L 19/0046 73/717 |
| 2021/0278747 | A1 | * | 9/2021 | Meng | G01L 9/0016 |

FOREIGN PATENT DOCUMENTS

| | | | |
|---|---|---|---|
| CN | 212482770 U | * | 2/2021 |
| TW | M596338 U | | 6/2020 |
| TW | I705236 B | | 9/2020 |

* cited by examiner

*Primary Examiner* — Andre J Allen
(74) *Attorney, Agent, or Firm* — Muncy, Geissler, Olds & Lowe, P.C.

(57) ABSTRACT

A pressure sensing metal diaphragm configured for deforming according to a pressure is provided, including: a main body, extending flat, including a through hole and a go-through structure configured for insertion of a movable. A pressure sensing diaphragm assembly including the pressure sensing metal diaphragm and a pressure sensing non-metal diaphragm is further provided, wherein the pressure sensing non-metal diaphragm covers the go-through structure. A pressure gauge including the pressure sensing diaphragm assembly is further provided.

8 Claims, 5 Drawing Sheets

PRESSURE SENSING METAL DIAPHRAGM, PRESSURE SENSING DIAPHRAGM ASSEMBLY AND PRESSURE GAUGE

BACKGROUND OF THE INVENTION

Field of the Invention

The present invention relates to a pressure sensing metal diaphragm, a pressure sensing diaphragm assembly and a pressure gauge.

Description of the Prior Art

The working principle of pressure gauge is through the elastic deformation of sensitive elements (such as Badden tube, diaphragm, bellows), and the deformation and displacement are transmitted through a movement mechanism to drive the pointer to rotate and display the corresponding pressure value. The diaphragm type pressure gauge can effectively avoid direct contact of the internal structure and the liquid to be detected, so it is suitable for measuring liquids with high pH, high viscosity, difficult to clean, and/or easy to crystallize. Therefore, the diaphragm type pressure gauge is common in daily life, such as the pressure sensing metal diaphragm disclosed in TW 1705236 or TW M596338.

The conventional pressure sensing metal diaphragm, such as those disclosed in TW 1705236 or TW M596338, are all wave-shaped. However, the wave-shaped diaphragm has lower sensitivity to small pressure changes, so it is only more suitable for measuring fluids with higher pressure. Besides, the wave-shaped diaphragm is formed by pressing, in which the forming pressure must exceed the strength of the yield point to allow the diaphragm to undergo plastic deformation and maintain a wave shape. However, the deformation of the diaphragm that has undergone plastic deformation results in non-linear deformation of the diaphragm, which causes impreciseness of the pressure gauge.

The present invention is, therefore, arisen to obviate or at least mitigate the above-mentioned disadvantages.

SUMMARY OF THE INVENTION

The main object of the present invention is to provide a pressure sensing metal diaphragm, a pressure sensing diaphragm assembly and a pressure gauge, which provides good consistency of physical characteristics on entire sensing regions and can be precisely responsive to the stress.

To achieve the above and other objects, a pressure sensing metal diaphragm configured for deforming according to a pressure is provided, including: a main body, extending flat, including a through hole and a go-through structure, the through hole being configured for insertion of a movable shaft so that the main body is movable with the movable shaft, the main body reticulating with the go-through structure. To achieve the above and other objects, a pressure sensing diaphragm assembly is provided, including: the pressure sensing metal diaphragm; and a pressure sensing non-metal diaphragm, including a first side portion and a second side portion opposite to the first side portion, the first side portion being disposed on a side of the pressure sensing metal diaphragm and covering the go-through structure of the pressure sensing metal diaphragm so that the go-through structure of the pressure sensing metal diaphragm is non-communicated with the second side portion.

To achieve the above and other objects, a pressure gauge is provided, including: a shell body, including a receiving space and an inlet channel; the pressure sensing diaphragm assembly, disposed in the receiving space and partitioning the receiving space into a first room and a second room which are non-communicated with each other, the second room being in communication with the inlet channel through a via hole; a movable shaft, disposed through and movable with the pressure sensing diaphragm assembly; a pressure responsive assembly, disposed in the first room and connected with the movable shaft, configured to provide a pressure value by responding to displacement of the movable shaft; a valve member, connected and movable with the movable shaft, located within the inlet channel, wherein when the movable shaft moves to an limit position, the valve member seals the via hole.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
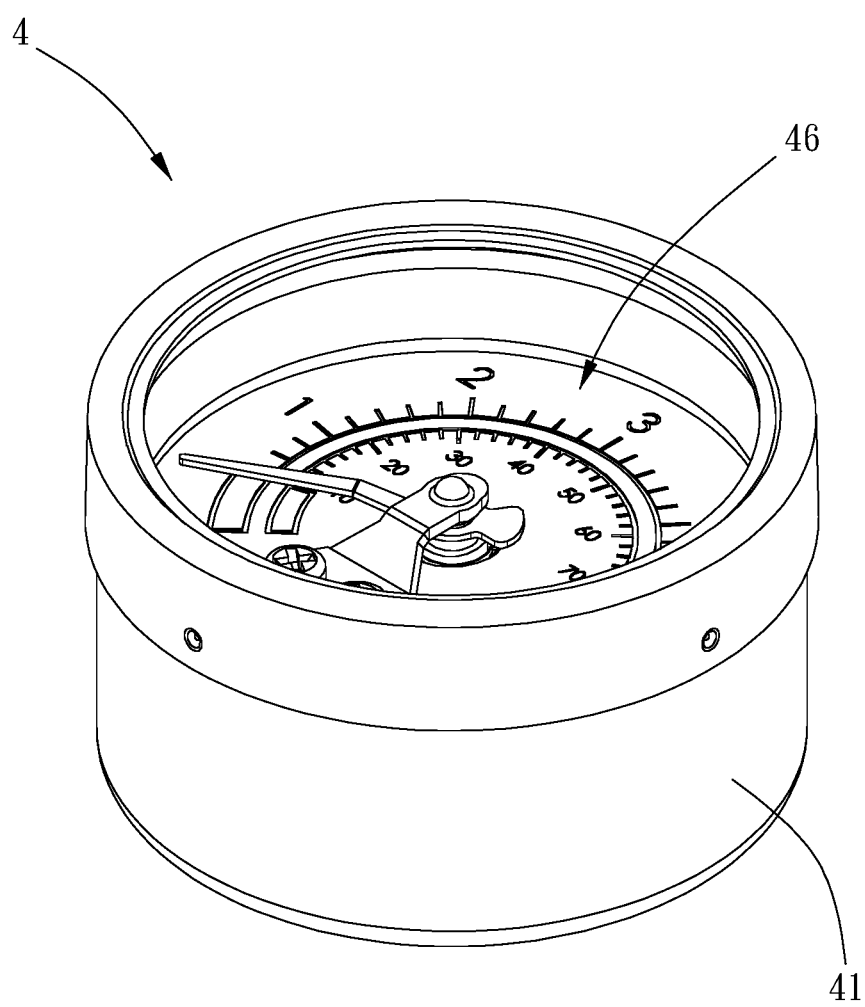
FIG. 1 is a stereogram showing a pressure gauge of a preferable embodiment of the present invention.
Figure 2:
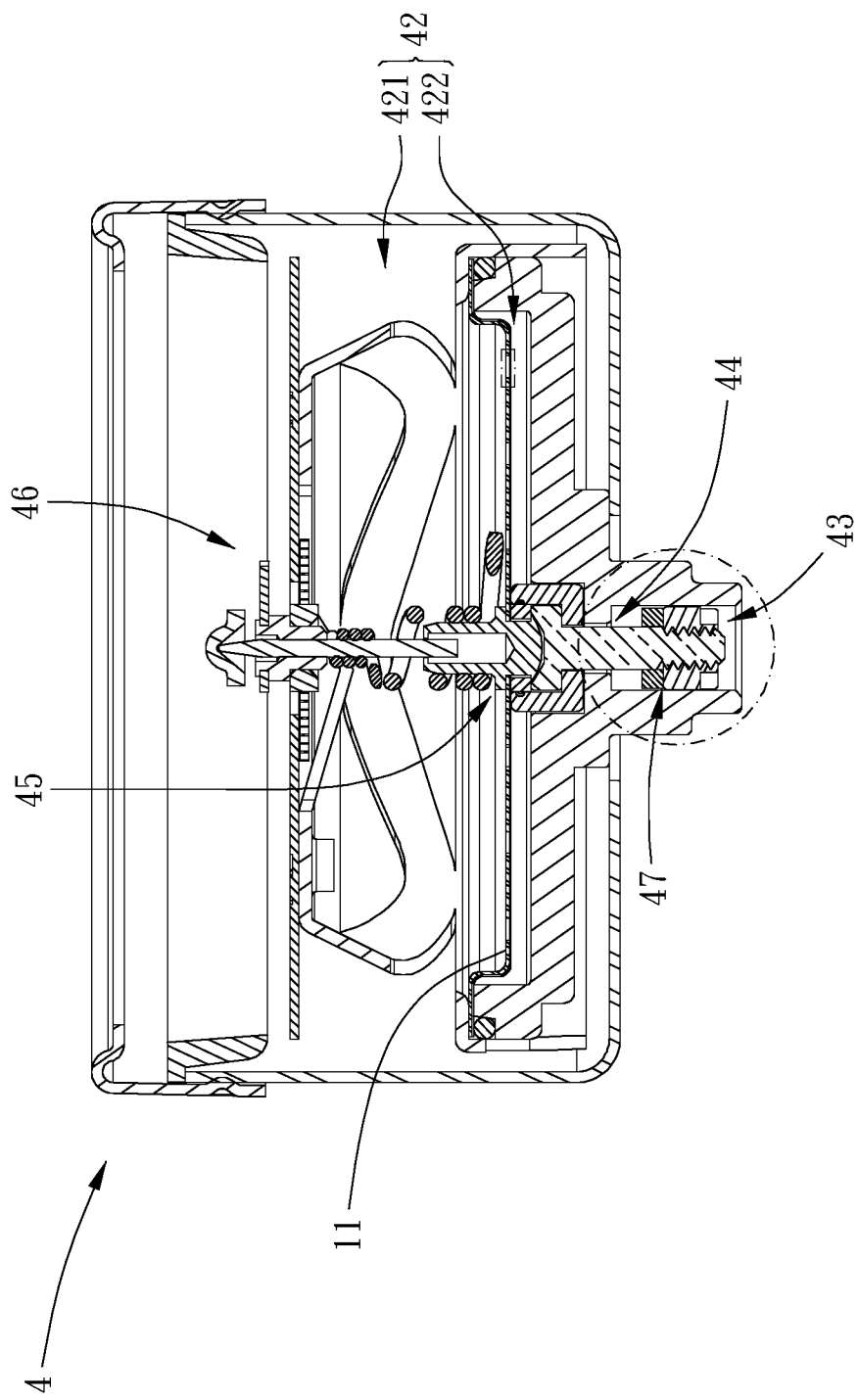
FIG. 2 is a cross-sectional view of FIG. 1.
Figure 3:
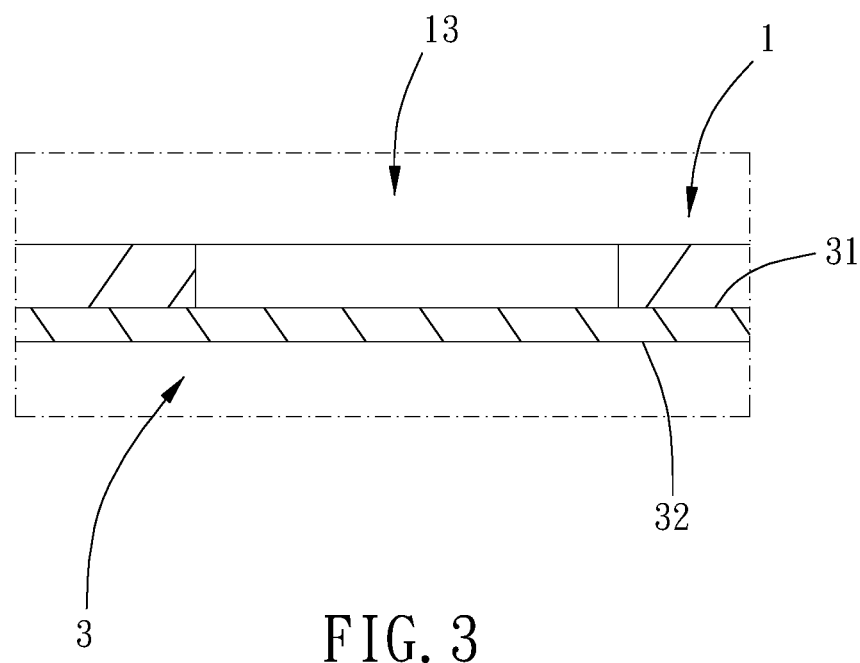
FIG. 3 is a partial enlargement of FIG. 2.
Figure 4:
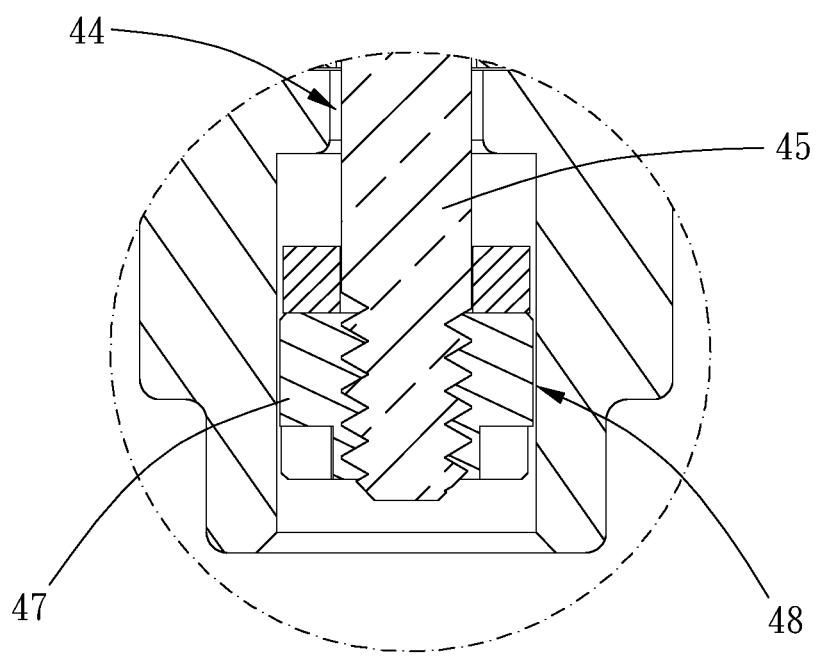
FIG. 4 is another partial enlargement of FIG. 2.
Figure 5:
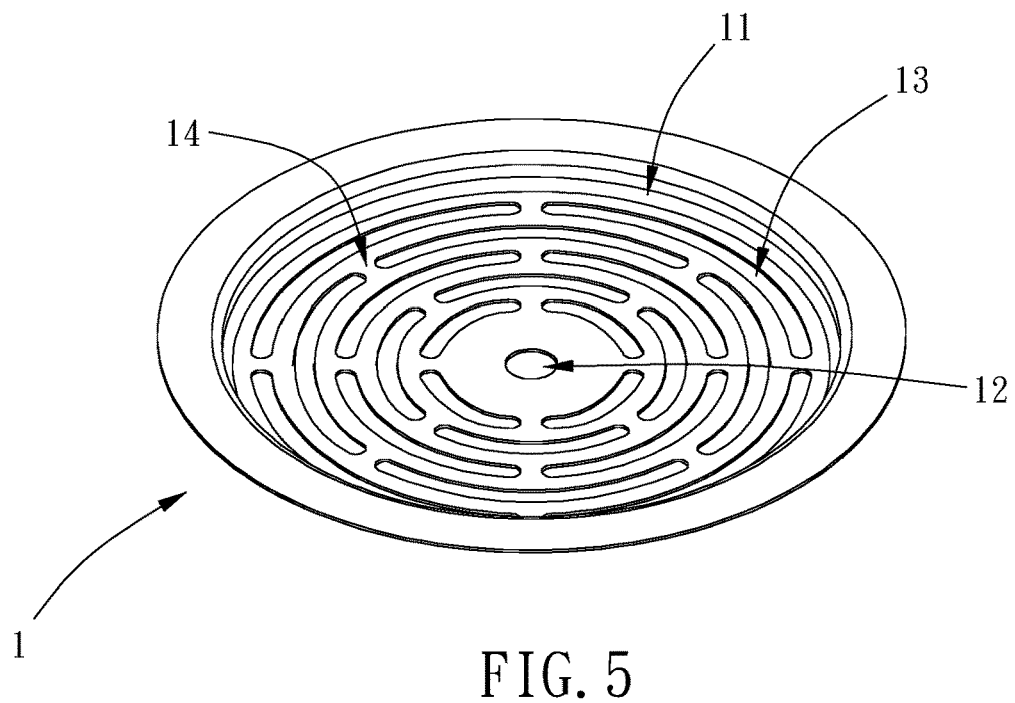
FIG. 5 is a stereogram showing a pressure sensing metal diaphragm of a preferable embodiment of the present invention.
Figure 6:
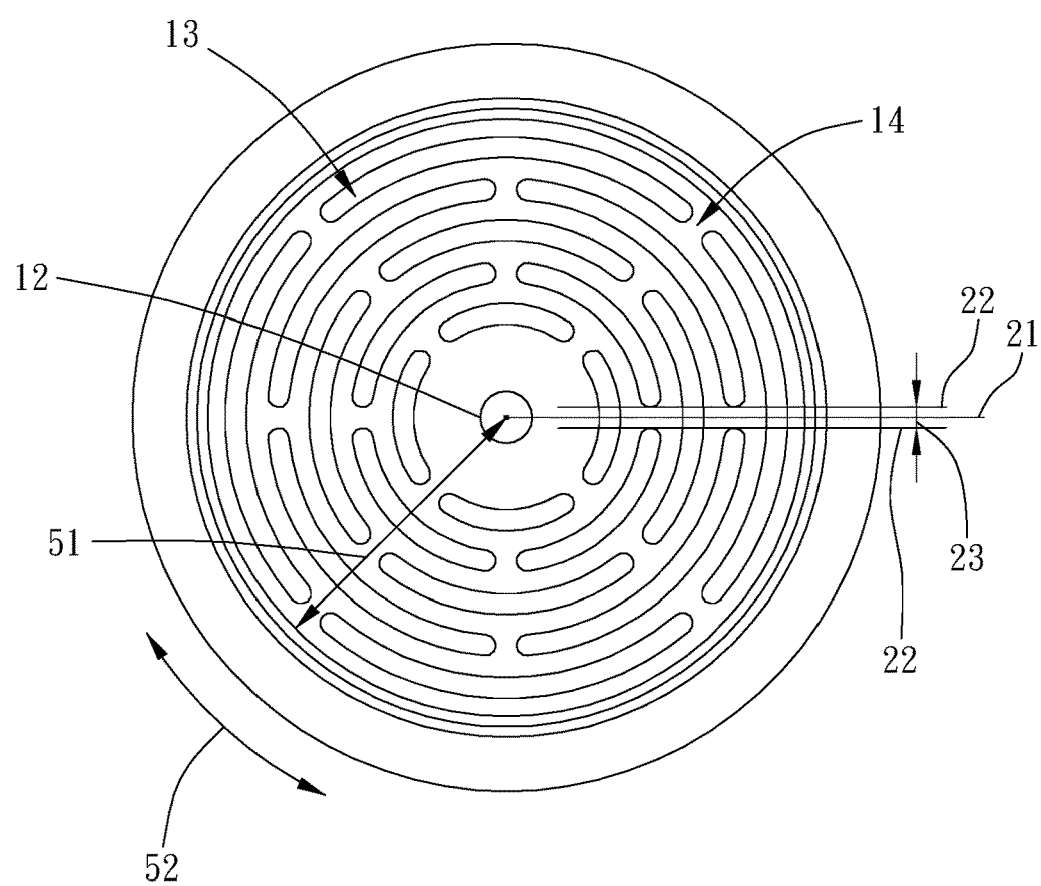
FIG. 6 is a top view of FIG. 5.

Please refer to FIGS. 1 to 6 for a preferable embodiment of the present invention. A pressure sensing metal diaphragm 1 configured to be mounted to a pressure gauge 4 for deforming according to a pressure. The pressure sensing metal diaphragm 1 includes a main body 11.

The main body 11 extends flat so that the main body 11 can deform in proportion to the stress linearly, which ensures the pressure sensing metal diaphragm 1 can be precisely responsive to the stress. Specifically, the main body 11 includes a through hole 12 and a go-through structure, the through hole 12 is configured for insertion of a movable shaft 45 so that the main body 11 is movable with the movable shaft 45, and the main body 11 reticulates with the go-through structure.

The go-through structure includes a plurality of incisions 13, and the plurality of incisions 13 are separately arranged and non-communicated with each other. Specifically, the pressure sensing metal diaphragm 1 defines a radial direction 51, the plurality of incisions 13 includes a plurality of groups which are disposed around the through hole 12 and are radially separate in interval in the radial direction 51, which provides good consistency of physical characteristics on entire regions of the main body 11.

Preferably, any neighboring two of the plurality of incisions 13 in the radial direction 51 define a fixed distance therebetween. In this embodiment, the plurality of groups each have the same number (four) of said incisions 13, said incisions 13 of each of the plurality of groups have the same extents extending about the through hole 12, and said incisions 13 of each of the plurality of groups have the same radial spans, which provides high consistency of deformation and physical characteristics on entire regions of the main body 11 in response to the stress.

In this embodiment, the pressure sensing metal diaphragm 1 defines a circumferential direction 52, and said incisions 13 of each of the plurality of groups respectively extend arcedly on a phantom circle along the circumferential direction 52, which can precisely transmit force and deform.

Any neighboring two of said incisions 13 of one of the plurality of groups is separated by a connection portion 14 which radially corresponds to a middle point of one said incision of another one of plurality of groups, forming a web structure which can be sensitively responsive to small pressure change. The connection portions 14 of two of the plurality of groups are located on a radial direction of the main body 11. Specifically, when the pressure sensing metal diaphragm 1 receives a force, the connection portions 14 of the innermost one of the plurality of groups are responsive to the force firstly, and stretch the connection portions 14 of the rest of the plurality of groups.

Specifically, when the pressure sensing metal diaphragm 1 is under pressure, the connection portions 14 deform and raise.

A center of the through hole 12 is located on a straight line 21 and through a portion (the connection portion 14) located between two said incisions 13 on the circumferential direction 52, two virtual boundary straight lines 22 are symmetrical to the straight line 21 and respectively tangent to the two said incisions 13, and the two virtual boundary straight lines 22 define an interval 23 therebetween. Preferably, said incisions 13 of each of the plurality of groups are circumferentially arranged equidistantly. In this embodiment, the interval 23, the distance between two said groups in the radial direction 51, and the span of the incision 13 in the radial direction 51 are 1 mm, which provides good consistency of physical characteristics on entire regions of the main body 11.

Figure 7:
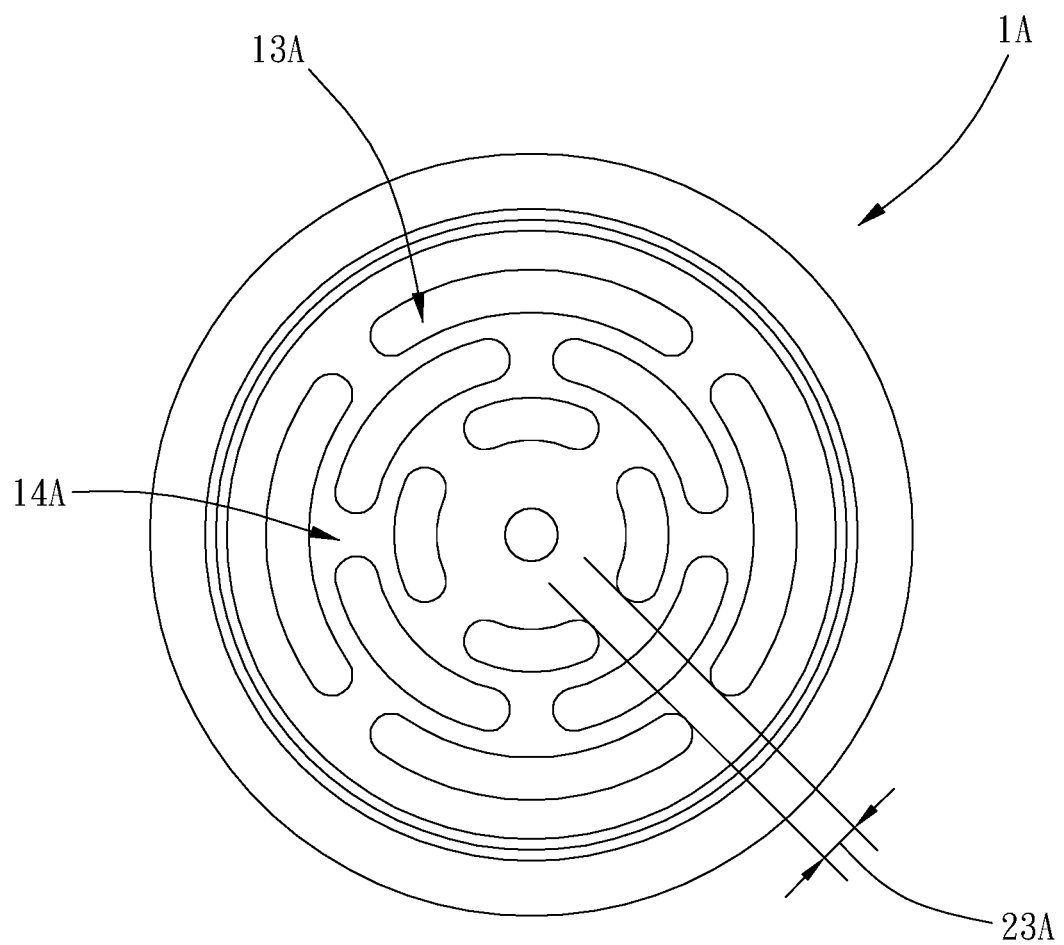
FIG. 7 is a top view of another pressure sensing metal diaphragm of a preferable embodiment of the present invention.

It is noted that at least one of the interval 23, the distance between two said groups in the radial direction 51 and the span of the incision 13 in the radial direction 51 may be designed to be of different from one another according to various requirements. For example, in an embodiment shown in FIG. 7, the pressure sensing metal diaphragm has wider incision 13, less groups, and larger interval 23 so that the connection portion 14A has a larger extent.

Please refer to FIGS. 1-6, the present invention further provides a pressure sensing diaphragm assembly. The pressure sensing diaphragm assembly includes the pressure sensing metal diaphragm 1 and a pressure sensing non-metal diaphragm 3.

The pressure sensing non-metal diaphragm 3 includes a first side portion 31 and a second side portion 32 opposite to the first side portion 31, and the first side portion 31 is disposed on a side of the pressure sensing metal diaphragm 1 and covers the go-through structure 12 of the pressure sensing metal diaphragm 1 so that the go-through structure 12 of pressure sensing metal diaphragm 1 is non-communicated with the second side portion 32. The pressure sensing non-metal diaphragm 3 can prevent the pressure sensing metal diaphragm 1 from contact of fluid, which improves the serves life of the pressure sensing metal diaphragm 1.

In practice, the pressure sensing non-metal diaphragm 3 may be made of rubber, polytetrafluoroethylene (PTFE) or expanded polytetrafluoroethylene (EPTFE), which is flexible, pliable and elastic.

The present invention further provides a pressure gauge 4. The pressure gauge 4 includes a shell body 41, the pressure sensing diaphragm assembly, the movable shaft 45, a pressure responsive assembly 46 and a valve member 47.

The shell body 41 includes a receiving space 42 and an inlet channel 43 within which the fluid flows; the pressure sensing diaphragm assembly is disposed in the receiving space 42 and partitions the receiving space 42 into a first room 421 and a second room 422 which are non-communicated with each other, and the second room 422 in communication with the inlet channel 43 via a via hole 44; the movable shaft 45 is disposed through and movable with the pressure sensing diaphragm assembly; the pressure responsive assembly 46 is disposed in the first room 421 and connected with the movable shaft 45 and is configured to provide a pressure value by responding to displacement of the movable shaft 45; the valve member 47 is connected and movable with the movable shaft 45 and is located within the inlet channel 43, wherein when the movable shaft 45 moves to a limit position, the valve member 47 covers and seals the via hole 44 so as to block the fluid from flowing into the second room 422.

Specifically, the inlet channel 43 has a radial dimension larger than a radial dimension of the via hole 44, the valve member 47 has a radial dimension smaller than the radial dimension of the inlet channel 43, and a gap 48 is formed between the valve member 47 and the inlet channel 43 for the fluid to flow therethrough. The radial dimension of the valve member 47 is larger than the radial dimension of the via hole 44 so that the valve member 47 can cover and seal the via hole 44.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A pressure sensing metal diaphragm configured for deforming according to a pressure, including:
   a main body, extending flat, including a through hole and a go-through structure, the through hole being configured for insertion of a movable shaft so that the main body is movable with the movable shaft, the main body reticulating with the go-through structure, wherein the go-through structure includes a plurality of incisions, and the plurality of incisions are separately arranged, the plurality of incisions includes a plurality of groups which are disposed around the through hole and are radially separate in interval, and any neighboring two of said incisions of one of the plurality of groups is separated by a connection portion which radially corresponds to a middle point of one said incision of another one of plurality of groups.

2. The pressure sensing metal diaphragm of claim 1, wherein any neighboring two of the plurality of incisions in a radial direction define a fixed distance therebetween.

3. The pressure sensing metal diaphragm of claim 1, wherein the plurality of groups each have the same number of said incisions, said incisions of each of the plurality of groups have the same extents extending about the through hole, and said incisions of each of the plurality of groups have the same radial spans.

4. The pressure sensing metal diaphragm of claim 1, wherein said incisions of each of the plurality of groups respectively extend arcedly on a phantom circle.

5. The pressure sensing metal diaphragm of claim 4, wherein the connection portions of two of the plurality of groups are located on a radial direction of the main body.

6. The pressure sensing metal diaphragm of claim 4, wherein said incisions of each of the plurality of groups are circumferentially arranged equidistantly.

7. A pressure sensing diaphragm assembly, including:
the pressure sensing metal diaphragm of claim 1; and
a pressure sensing non-metal diaphragm, including a first side portion and a second side portion opposite to the first side portion, the first side portion being disposed on a side of the pressure sensing metal diaphragm and covering the go-through structure of the pressure sensing metal diaphragm so that the go-through structure of the pressure sensing metal diaphragm is non-communicated with the second side portion.

8. A pressure gauge, including:
a shell body, including a receiving space and an inlet channel;
the pressure sensing diaphragm assembly of claim 7, disposed in the receiving space and partitioning the receiving space into a first room and a second room which are non-communicated with each other, the second room being in communication with the inlet channel through a via hole;
a movable shaft, disposed through and movable with the pressure sensing diaphragm assembly;
a pressure responsive assembly, disposed in the first room and connected with the movable shaft, configured to provide a pressure value by responding to displacement of the movable shaft;
a valve member, connected and movable with the movable shaft, located within the inlet channel, wherein when the movable shaft moves to a limit position, the valve member seals the via hole.

* * * * *